May 24, 1955  C. F. KRAMER  2,709,105

MOTOR VEHICLE FLOOR MAT

Filed Aug. 23, 1952

C. F. KRAMER
INVENTOR.

BY E. C. McRae
J. R. Faulkner
T. H. Oster

ATTORNEYS

United States Patent Office 2,709,105
Patented May 24, 1955

2,709,105

MOTOR VEHICLE FLOOR MAT

Clarence F. Kramer, Birmingham, Mich., assignor to Ford Motor Company, Dearborn, Mich., a corporation of Delaware Application August 23, 1952, Serial No. 306,006

1 Claim. (Cl. 296—1)

This invention relates generally to motor vehicles and particularly to an improved floor mat for the passenger compartment of a motor vehicle.

Heretofore it has been customary to provide, upon the floor panel of the passenger compartment of a motor vehicle body, a relatively thin molded rubber floor mat spaced from the sheet metal floor panel by means of a separate layer of padding usually formed of jute or other fibrous material. A suitable pattern has been molded into the upper surface of the rubber mat and the lower surface which rests upon the padding has been smooth. The jute padding customarily used provides a cushioning effect but is subject to several disadvantages. For example, if the jute padding becomes wet due to the entrance of water either from the edges of the padding or through improperly sealed openings in the floor panel or from condensation or other sources, the padding stays wet for a considerable length of time since there is no drainage or circulation of air. The wet padding causes the floor panel to rust and in addition may result in objectionable odors. The overcoming of these and other objections is accordingly an object of the present invention.

In the embodiment described herein, a one piece rubber mat is positioned directly upon a crowned floor panel which slopes downwardly from its central portion toward the door openings on opposite sides of the vehicle body, and which is adapted to be positioned directly upon the body floor panel without the interposition of padding or the like. The lower surface of the rubber mat is formed with a series of integral longitudinally spaced and laterally extending ribs separated from each other by laterally extending grooves, with the ribs directly engaging the sheet metal floor panel to support the mat thereon and to resist slipping movement of the mat in a longitudinal direction, and with said grooves forming unobstructed passageways leading from the central portion of the crowned floor panel downwardly and laterally toward the door openings on opposite sides of the vehicle body to ventilate the upper surface of the floor panel and to provide drainage for water toward the door openings as well as to provide a softer cushioning effect to the mat and to increase its wear under scuffing conditions.

Other objects and advantages of this invention will be made more apparent as this description proceeds, particularly when considered in connection with the accompanying drawings, wherein.

Figure 1:
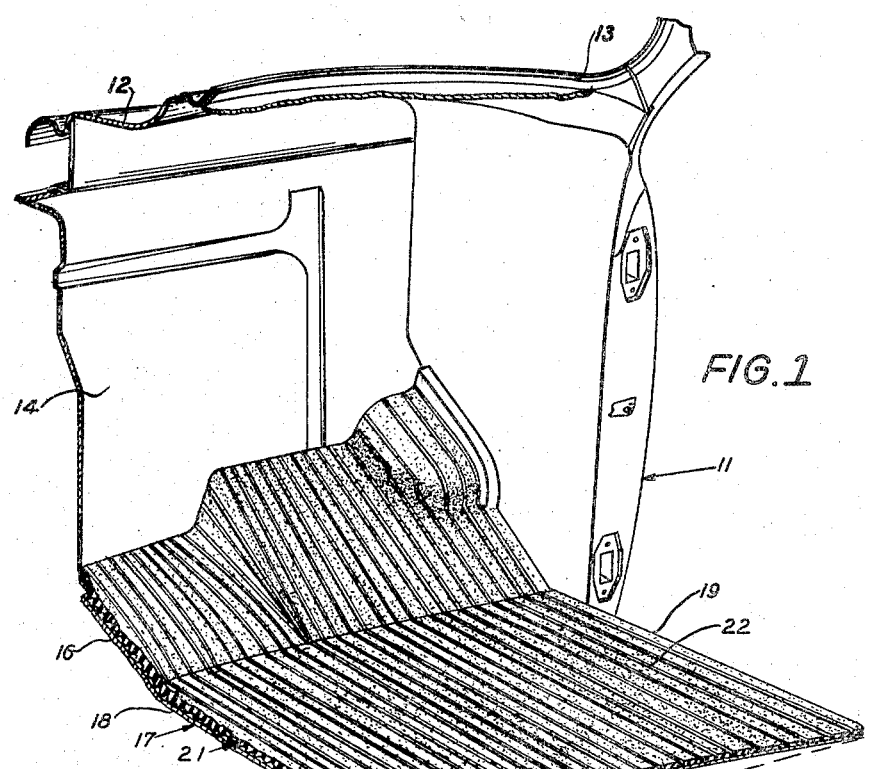
Figure 1 is a fragmentary perspective view of a portion of the passenger compartment of a motor vehicle body incorporating the present invention.
Figure 3:
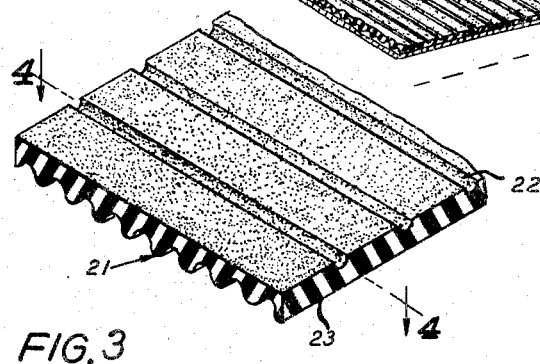
Figure 3 is an enlarged fragmentary perspective view of the floor mat shown in Figure 1.
Figure 2:
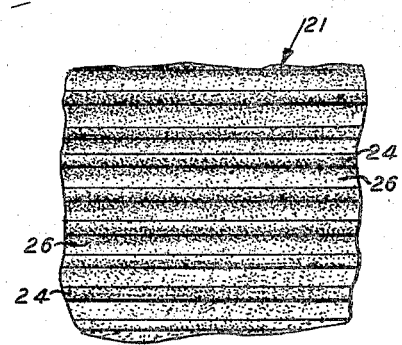
Figure 2 is an enlarged bottom plan view of the floor mat shown in Figure 1.

Referring now to the drawings, and particularly to Figure 1, the reference character 11 indicates generally a motor vehicle body having a cowl 12, a windshield opening 13, a generally vertically extending bulkhead 14 between the passenger and engine compartments of the body, a toeboard 16 and a floor panel 17. The floor panel 17 is generally horizontal in a longitudinal direction but is crowned in a transverse or lateral direction so that it slopes gradually downwardly in opposite directions from its central portion 18. Adjacent each side of the crowned floor panel 17 is a door opening 19.

Covering the toeboard 16 and the floor panel 17 is a one piece molded floor mat 21. The mat may be formed of rubber or a suitable synthetic material having the necessary resiliency and flexibility, and for the purposes of this application the term "rubber" will be used to mean any material having these characteristics.

A suitable pattern 22 is formed upon the upper surface of the mat 21 for decorative purposes and to provide proper traction.

Figure 4:
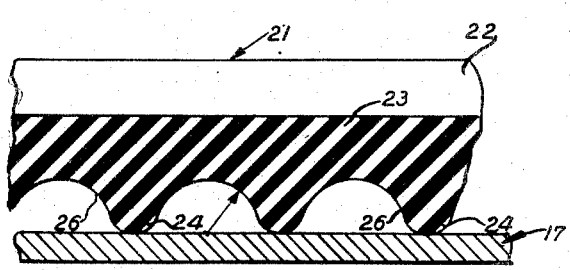
Figure 4 is a greatly enlarged longitudinal cross-sectional view taken substantially on the plane indicated by the line 4—4 of Figure 3.

Referring now particularly to Figure 4, the body portion 23 of the mat is relatively thick, and the lower surface is formed during the molding thereof with a plurality of laterally extending longitudinally spaced ribs 24 each extending the entire width of the mat. The marginal edge of each rib 24 is arcuate in cross-section and directly engages the upper surface of the sheet metal floor panel 17. The ribs afford resistance to slippage or sliding movement of the mat 21 relative to the floor panel 17 in a longitudinal direction, and have somewhat of a "squeegee" gripping action.

Intermediate the laterally extending ribs 24 on the lower surface of the floor mat are a series of laterally extending grooves 26. In the present instance the grooves are also arcuate or semicircular in cross-section and are considerably wider than the width of the ribs 24. The center line of each semicircular shaped groove 26 lies substantially on the plane passing through the marginal edges of the ribs 24, or in other words upon the upper surface of the floor panel 17 when the mat is positioned thereon.

It will now be apparent that each laterally extending groove 26 forms an unobstructed free passageway from the high central portion 18 of the floor panel 17 downwardly and laterally outwardly toward each door opening 19, since the flexible rubber mat follows the contour of the crowned floor panel 17 so that the ribs 24 of the mat rest directly upon the floor panel throughout their length.

The transversely extending alternate ribs and grooves formed on the lower surface of the floor mat 21 provide corrugations affording a softer cushioning effect to the mat. In addition, since the grooves extend the complete width of the mat and are open at the ends, they provide ventilation for drying out the floor panel 17 whenever it becomes wet or damp from any cause whatsoever, thus decreasing the likelihood of the floor panel 17 seriously rusting from the upper surface. Since the transversely extending ribs and grooves follow the contour of the crowned floor panel 17, the grooves provide passageways permitting water drainage toward the door openings, thus efficiently draining any water which may gather beneath the floor mat. The elimination of a separate fibre or jute padding beneath the rubber mat effects a saving which permits a thicker mat to be utilized for a comparable overall price.

It will be understood that the invention is not to be limited to the exact construction shown and described, but that various changes and modifications may be made without departing from the spirit and scope of the invention, as defined in the appended claim.

What is claimed is:

In a motor vehicle body having a passenger compartment provided with door openings on opposite sides thereof and with a crowned sheet metal floor panel extending laterally of the body and sloping progressively downwardly from its higher central portion toward each of said door openings with the portions of said floor panel adjacent each door opening being at least as high as the lower edge of the adjacent door opening, a relatively thick molded rubber floor mat adapted to be positioned directly upon said floor panel without the interposition of padding or the like, said floor mat having a shallow decorative pattern molded on its upper surface and a shallow corrugated pattern on its lower surface with said corrugated lower surface comprising a series of alternate ribs and grooves extending laterally of the vehicle body in longitudinally spaced relationship to each other, said ribs having arcuate edge portions directly engaging the sheet metal floor panel to grip the latter and resist sliding movement of the mat on the floor panel in a longitudinal direction, and said laterally extending grooves being generally semicircular in cross-section and being considerably wider in a direction longitudinally of the vehicle than the width of the arcuate ribs to form a plurality of free passageways extending from the high central portion of the crowned floor panel downwardly and laterally outwardly toward said door openings to the extreme edge of said mat and terminating above the bottom edge of said door openings to ventilate the upper surface of said floor panel and to provide adequate direct drainage for water from the floor panel to points exteriorly of the vehicle through the laterally extending grooves and the door openings, said ribs being relatively narrow and varying somewhat in width in cross-section with their narrowest portions adjacent the floor panel to provide a resilient mounting for said floor mat yieldable under load to provide a cushioning effect.

References Cited in the file of this patent

UNITED STATES PATENTS

| | | |
|---|---|---|
| 1,948,327 | Berwick | Feb. 20, 1934 |
| 2,386,280 | Ulrich | Oct. 9, 1945 |
| 2,534,137 | Lewis | Dec. 12, 1950 |

FOREIGN PATENTS

| | | |
|---|---|---|
| 634,414 | France | Nov. 18, 1927 |